United States Patent
Rong et al.

(10) Patent No.: US 6,950,401 B2
(45) Date of Patent: Sep. 27, 2005

(54) APPARATUS, AND ASSOCIATED METHOD, FOR FACILITATING RESOURCE ALLOCATION IN A COMMUNICATION SYSTEM

(75) Inventors: Zhigang Rong, Irving, TX (US); Lin Ma, Irving, TX (US); Petteri Luukkanen, Irving, TX (US)

(73) Assignee: Nokia Corporation, Espoo (FI)

( * ) Notice: Subject to any disclaimer, the term of this patent is extended or adjusted under 35 U.S.C. 154(b) by 789 days.

(21) Appl. No.: 09/741,940

(22) Filed: Dec. 20, 2000

(65) Prior Publication Data

US 2002/0075889 A1 Jun. 20, 2002

(51) Int. Cl.$^7$ ............................................... H04L 12/26
(52) U.S. Cl. ...................................... 370/252; 375/227
(58) Field of Search .............................. 370/252, 342, 370/441, 328, 329, 335, 209, 336, 337, 345, 347, 349, 442, 443, 444; 375/131, 132, 135, 136, 137, 130

(56) References Cited

U.S. PATENT DOCUMENTS

| | | | | |
|---|---|---|---|---|
| 5,920,552 A | * | 7/1999 | Allpress et al. | 370/335 |
| 6,167,031 A | * | 12/2000 | Olofsson et al. | 370/252 |
| 6,335,922 B1 | * | 1/2002 | Tiedemann et al. | 370/335 |
| 6,366,601 B1 | * | 4/2002 | Ghosh et al. | 375/130 |
| 6,389,066 B1 | * | 5/2002 | Ejzak | 375/224 |
| 6,473,395 B1 | * | 10/2002 | Lee | 370/209 |
| 6,611,512 B1 | * | 8/2003 | Burns | 370/342 |
| 6,650,686 B1 | * | 11/2003 | Kondo | 375/130 |
| 6,707,788 B1 | * | 3/2004 | Kim et al. | 370/203 |
| 6,823,005 B1 | * | 11/2004 | Chuang et al. | 375/227 |
| 6,865,233 B1 | * | 3/2005 | Eriksson et al. | 375/261 |
| 2002/0037015 A1 | * | 3/2002 | Shanbhag | 370/441 |
| 2002/0067692 A1 | * | 6/2002 | Yun et al. | 370/209 |
| 2002/0110102 A1 | * | 8/2002 | Wei et al. | 370/335 |

* cited by examiner

Primary Examiner—Frank Duong
Assistant Examiner—Michael J. Moore

(57) ABSTRACT

Apparatus, and an associated method, for allocating resources in a communication system, such as a multi-code, multi-rate CDMA communication system. Communication indicia by which data to be communicated during operation of the communication system is coded and modulated is selected responsive to communication characteristics of the communication channel upon which the data is to be communicated. The levels of coding and modulating are determined responsive to measured levels of the communication characteristics on the channel. Also, a scheduler by which to schedule packet communication upon a shared communication channel is provided.

21 Claims, 4 Drawing Sheets

| | MCS 1 | MCS 2 | ... | MCS j | ... | MCS L |
|---|---|---|---|---|---|---|
| 1 CODE CHANNEL | $T_{11}$ | $T_{12}$ | ... | $T_{1j}$ | ... | $T_{1L}$ |
| 2 CODE CHANNELS | $T_{21}$ | $T_{22}$ | ... | $T_{2j}$ | ... | $T_{2L}$ |
| ☐ | ☐ | ☐ | ☐ | ☐ | ☐ | ☐ |
| i CODE CHANNELS | $T_{i1}$ | $T_{i2}$ | ... | $T_{ij}$ | ... | $T_{iL}$ |
| ☐ | ☐ | ☐ | ☐ | ☐ | ☐ | ☐ |
| k CODE CHANNELS | $T_{k1}$ | $T_{k2}$ | ... | $T_{kj}$ | ... | $T_{kL}$ |

FIG. 2

APPARATUS, AND ASSOCIATED METHOD, FOR FACILITATING RESOURCE ALLOCATION IN A COMMUNICATION SYSTEM

The present invention relates generally to a manner by which to select allocation of resources to communicate data in a communication system, such as a packet-based, CDMA (code-division, multiple-access) radio communication system which uses multiple-coding schemes and multiple-rates of transmission. More particularly, the present invention relates to apparatus, and an associated method, by which to select communication indicia, such as a Walsh coding number and a MCS (modulation coding scheme), by which to convert data for communication upon a communication channel. The present invention further relates to a manner by which to schedule communication of packet data upon a shared channel in a multi-user communication system.

BACKGROUND OF THE INVENTION

A communication system is formed, at a minimum, of a sending station and a receiving station interconnected by way of a communication channel. Information generated at the sending station is communicated to the receiving station upon the communication channel. A wide variety of different types of communication systems have been developed and are regularly utilized to effectuate communication of information between sending and receiving stations.

Advancements in communication technologies have permitted the development, and construction, of new types of communication systems. A radio communication system is exemplary of a type of communication system which has benefited from advancements in communication technologies. A communication channel formed between the sending and receiving stations of a radio communication system are defined upon a radio link. Because a radio link is utilized to form the communication channel, the conventional need to utilize wireline connections between the sending and receiving stations is obviated. Increased communication mobility is, as a result, inherent in a radio communication system in contrast to a conventional wireline system.

The communication capacity of a radio communication system, however, is sometimes constricted as a result of bandwidth limitations. Only a limited amount of the electromagnetic spectrum is typically allocated to be used by a particular radio communication system and upon which communication channels can be defined. Communication capacity increase of a radio communication system is, therefore, sometimes limited by such allocation of bandwidth. Increase of the communication capacity of the radio communication system, therefore, is sometimes only possible by increasing the efficiency by which the allocated spectrum is used.

Digital communication techniques are amongst the advancements in communication technologies which have advantageously been implemented in various communication systems. Digital communication techniques permit the bandwidth efficiency of communications upon a communication channel in a communication system to be increased. Due to the particular need to efficiently utilize the bandwidth allocated in a radio communication system, the use of such digital techniques is particularly advantageously utilized in a radio communication system.

A cellular communication system is exemplary of a radio communication system in which digital communication techniques are regularly utilized. Various cellular standards have been promulgated, and cellular communication systems are generally constructed to be operable in compliance with a selected one, or more, of the standards. For instance, a cellular standard, referred to as the IS-95/IS-2000 standard defines a CDMA (Code-Division, Multiple Access)-based cellular communication system. Cellular communication systems in compliance with this standard have been installed throughout wide geographical areas.

Users of a cellular communication system are able to communicate telephonically by way of mobile stations to communicate voice information, herein referred to also as voice data, as well as other types of information, herein referred to as nonvoice data.

The communication channels upon which data is communicated in a cellular communication system, as well as other types of communication systems, are usually not ideal channels. That is to say, data transmitted upon a communication channel is distorted, or otherwise altered, during its communication upon the channel. When received at a receiving station, the data differs, in some respects, to the data actually transmitted by the sending station. Distortion is caused by, for instance, multi path transmission, Rayleigh fading, and other distortion.

To compensate for the distortion of the data during its communication on the communication channel, various manners have been developed. For instance, various coding and modulation schemes are utilized to increase the efficiency of the usage of the spectrum upon which the communication channel is defined and upon which the data is communicated. Even if portions of the data are distorted, the increased redundancy of the data permits the informational content of the data to be ascertained. Increasing the redundancy of the data, however, causes a reduction of the throughput rate of the data. As a high throughput rate is generally a desired goal of operation of a communication system, the need to increase the redundancy of the data competes against the competing goal of maximizing throughput rates.

In a CDMA communication system, Walsh coding is utilized to spread data prior to its communication upon a communication channel. Additionally, a MCS (modulation coding scheme) is also utilized to modulate and encode the data prior to its communication upon the communication channel. The amount of redundancy introduced upon the data is determined by the coding rate of a channel encoder which forms a portion of the sending station, such as the transmit portion of the mobile station. And, the number N of Walsh codes by which the data is spread is, in part, determinative of the throughput rate of the data.

Proposals for a new, cellular CDMA system, referred to as a 3G (third generation) system proposes a manner by which to increase throughput rates, at least upon a forward link between a base transceiver station and a mobile station by utilizing link adaptation methods. In such a method, one of several modulation encoding schemes (MCS) is chosen for a specific communication session between the base transceiver station and the mobile station, based upon communication quality levels upon the forward link extending from the base transceiver station to the mobile station. When the communication quality level of the forward link is good, MCS that exhibits high data rates can be assigned to the communication session. Communications to be effectuated upon a communication link of poor quality can be assigned with an MCS that exhibits a lower data rate. Higher data rates are achievable, for instance, by using a multi-code scheme in which the data symbol stream of the data of one communication session is demultiplexed into several lower symbol rate streams, and each of the lower symbol rate streams is covered by an orthogonal spreading, e.g., the aforementioned Walsh code. And, if the MCS is fixed, the aggregated data rate is proportional to the number of Walsh codes which are utilized.

Proposals have been set forth pursuant to the proposed 3G system of which to utilize both the link adaptation and multi-codings to improve system throughput.

The proposed 3G CDMA system also provides for packet-based communications upon shared channels. Improved communication capacity is provided in systems which utilize shared channels as communication pursuant to a polarity of communication sessions are effectuable upon the shared channel. Packet data generated pursuant to separate communication sessions to be communicated to separate mobile stations in the system are provided to a base transceiver station. Scheduling is performed at the base transceiver station to schedule transmission of the data packets upon the shared channel so that collisions during communication do not occur. The manner by which the data packets are scheduled for communication upon the communication channel is determinative of the throughput rate pursuant to a particular communication session, as well as the quality of service (QoS) of the communication session.

Manners by which the number N of the Walsh codes, selection of the MCS, and operation of scheduling of the data packets upon the communication channel are all determinative of the throughput and quality rates of a communication session.

Manners by which to select the N of the Walsh codes, the type of MCS, and the packet scheduling would advantageously facilitate communications in the communication system.

It is in light of this background information related to communications in a communication system that the significant improvements of the present invention have involved.

SUMMARY OF THE INVENTION

In these and other aspects, therefore, an apparatus, and an associated method, is provided by which to select allocation of resources to communicate data in a communication system.

Through operation of an embodiment of the present invention, a manner is provided by which to select communication indicia, such as a Walsh coding number and a MCS (modulation coding scheme) by which to convert data for communications upon a communication channel.

Also through operation of an embodiment of the present invention, a manner is provided by which to schedule communication of packet data upon a shared channel in a multi-user communication system.

In one aspect of the present invention, a matrix of values of exemplary threshold values is formed at a storage device located at a base transceiver station, or other network infrastructure device, of a radio communication system. Each exemplary threshold value of the matrix is defined by a number N of Walsh code channels and also a MCS-type. Measured values of threshold levels are compared with the exemplary threshold values of the matrix. Responsive to the comparisons, selection is made of one of the exemplary threshold values, defined by an associated pair of values of N and a MCS-type. Data to be communicated pursuance to a communication session is coded and modulated according to the values associated with the selected threshold value. Thereby, assignation of the MCS and the number N of Walsh code channels to be used pursuant to a communication session are together quickly selected.

More generally, a matrix is formed of a plurality of exemplary threshold values which are indexed together with a pair of communication indicia which define the matrix of which the exemplary threshold values form. Comparison of the exemplary threshold values with a measured value and subsequent selection of a selected one of the exemplary threshold values and the pair of communication indicia associated therewith are determinative of the manner by which data to be communicated pursuance to operation of a communication system are operated upon. Thereby, single selection provides values of at least two communication indicia.

In another aspect of the present invention, measurements made by a mobile station operative in a cellular communication system of characteristics of a forward link channel are provided to a base transceiver station. The value of the measured threshold value is formed responsive to indications of the characteristics measured by the mobile station. In, for instance, a cellular communication system in which signals are transmitted by a base transceiver station to a mobile station on forward links defining both a pilot channel and a traffic channel, the mobile station tunes to the pilot channel and performs signal measurements of a pilot signal transmitted upon the pilot channel. The mobile station measures, for instance, a signal-to-noise ratio of the pilot signal. The value measured, or otherwise determined, at the mobile station is returned to the base transceiver station. Mapping of the indications of the measured value to a value representative of the communication characteristics of the corresponding traffic channel is then made. The mapped value is then used in the comparison operations with the exemplary threshold values of the matrix.

In another aspect of the present invention, a manner is provided by which to schedule allocation of a shared, packet channel upon which to communicate data packets pursuant to two or more separate communication sessions. A metric is provided which represents the transmission order of the data packets pursuant to the separate communication sessions. The metric is a weighted sum of an indication of the quality of the communication characteristics exhibited by the packet channel and the time period of dependency of the data packet prior to its selection for communication upon the packet channel. The metric selectively further includes one or more additional factors related to the quality of service (QoS) of the communication session. Buffering is provided by a buffer positioned at the base transceiver station at which to buffer the data packets which are to be communicated to the two or more mobile stations pursuant to the separate communication sessions. A timer is provided for timing dependency of each of the data packets at the buffer. Indications of the time periods of dependency of the data packets are utilized, together with the indication characteristics of the packet channel in the scheduling of the communication of the data packets by the base transceiver station. That is to say, the transmission order of the data packets is selected responsive to the measured time periods of pendency of the data packets together with the communication characteristics of the packet channel.

In one implementation, an embodiment of the present invention is implemented at a base transceiver station to be operable in a 3G, CDMA cellular communication system, such as a proposed "1XTREME" system. A storage device is provided at which a matrix formed of a plurality of exemplary threshold values is stored. Each element of the matrix is defined by a pair of communication indicia, here a value N of the number of Walsh codes and a MC S-type. Measurements of a signal-to-noise ratio of signals received at the mobile station upon a pilot channel are made and communicated to the base transceiver station. Mapping of the measured value associated with the pilot channel is made to the forward link of the traffic channel. The mapped value is utilized to compare with values of the exemplary threshold values. One exemplary threshold value is selected and the pair of communication indicia associated therewith is utilized in the formation of a signal which is to be communicated by the base transceiver station to the mobile station.

In another implementation, a manner is provided by which to schedule the communication of data packets upon a packet channel utilized pursuant to two or more communication sessions with two or more separate mobile stations. A buffer is provided at which to buffer the data packets prior to their transmission to the mobile stations. And, a timer is utilized to time the pendency of the data packets at the buffer. A metric is utilized to schedule the allocation of data packets for communication pursuant to the separate communication sessions responsive to their respective pendency at the buffer together with measured indications of the communication characteristics of the packet channel.

Thereby, a manner is provided by which to allocate resources for the communication of data in the communication system.

In these and other aspects, therefore, an apparatus, and an associated method, is provided for a communication system in which data is communicated between a first communication station and at least a second communication station upon a traffic channel. Selection of resource allocation in the communication system is facilitated. The resource allocation is defined in terms of a first communication indicia and a second communication indicia. A storage device has memory locations for storing a matrix defined by values of the first communication indicia and the second communication indicia. Each element of the matrix is of an exemplary threshold value. A comparator is coupled to the storage device. The comparator compares a traffic channel threshold value with at least some of the exemplary threshold values. A selector is coupled to the comparator. The selector selects the resource allocation responsive to comparisons made by the comparator. The resource allocation is defined in terms of the first communication indicia and the second communication indicia associated with a selected one of the exemplary threshold values.

In these and other aspects, therefore, an apparatus, and an associated method, is also provided for a multi-user communication system in which data is communicated between first and second communication stations and between the first communication station and a third communication station pursuant to separate communication sessions upon a shared channel. A scheduler is provided for scheduling access to the shared channel upon which to communicate the data between the first and second communication stations and between the first and the third communication stations.

The present invention will be better understood when read in light of the accompanying drawings which are described in the detailed description hereinbelow and in light of the claims appended hereto.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 2 illustrates a representation of the matrix which forms a portion of an embodiment of the present invention.

DETAILED DESCRIPTION OF THE PREFERRED EMBODIMENTS

Figure 1:
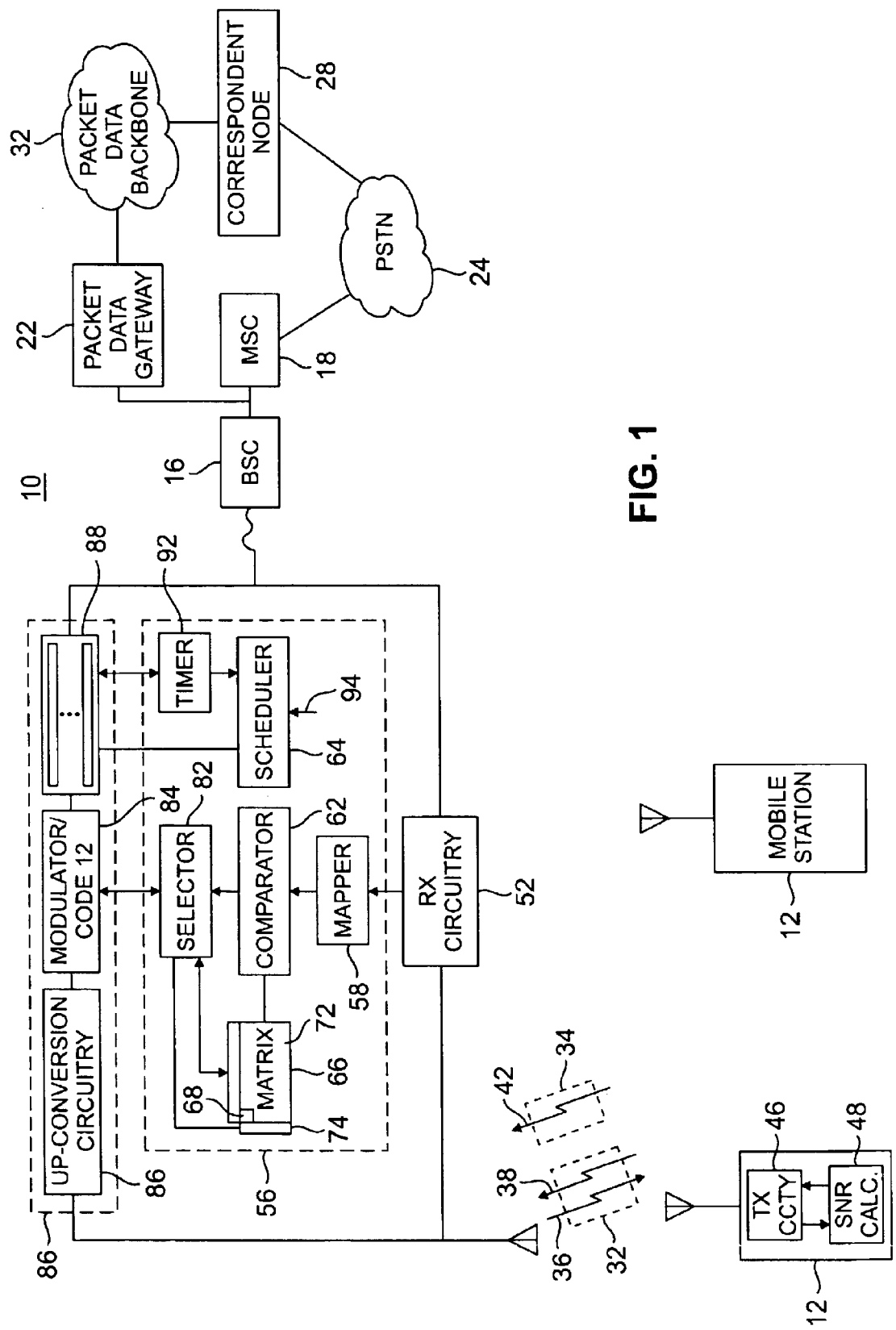
FIG. 1 illustrates a functional block diagram of a communication system in which an embodiment of the present invention is operable.

Referring first to FIG. 1, a communication system, showing generally at 10, provides for radio communications with mobile stations 12, of which two mobile stations are shown in the figure. While only two mobile stations are shown in the figure, the communication system is a multi-user system, typically permitting communications with a large number of mobile stations analogous to the mobile stations 12.

In the exemplary implementation, the communication system 10 forms a cellular communication system operable pursuant, e.g., to the IS-95/IS-2000 standard, or a variant thereof such as the so-called 1XTREME system. The standard pertains to a CDMA (code to division, multiple access) communication scheme and which also provides for packet-based communications. That is to say, packet high is to data is communicated during operation of the communication system. While the following description shall describe operation of an embodiment of the present invention with respect to the exemplary implementation, it should be understand that, and other implementations, embodiments of the present invention can analogously be implemented.

The communication system includes network infrastructure of a radio part thereof, here shown to include a base transceiver station 14 operable to transceive data-containing communication signals with the mobile stations by way of radio links formed therebetween. The base transceiver station is, in turn, coupled to a base station controller (BSC) 16 which is operable, amongst other things, to control operation of the base transceiver station. And, in turn, the base station controller is coupled to a mobile switching center (MSC) 18 and, also, to a packet data gateway 22.

The mobile switching center is connected by way of an external network, here a public-switched telephonic network (PSTN) 24, with a correspondent node 28. A communication path is formable between the correspondent node 28 and a mobile station 12 by way of the PSTN, the network infrastructure of the communication system, and a radio link formed between the mobile station and a base transceiver station 14.

The packet data gateway, analogously, is also coupled, here to the same correspondent node 28, by way of a packet data network backbone 32. A communication path is formable between the correspondent node 28 and the mobile station 12 by way of the backbone network 32, the network infrastructure of the communication system, and a radio link formed between the base transceiver station and a mobile station.

The radio link formed between the base transceiver station and the mobile stations 12 includes both a forward link 32 and a reverse link 34. The forward link 32 includes a pilot channel, represented by the arrow 36 and the forward link portion of a traffic channel 38. The reverse link 34 is here shown to include a reverse link portion, represented by the arrow 42, of the traffic channel.

During operation of the communication system, the mobile stations, are at selected times, tuned to the pilot channel to detect pilot signals generated thereon by the base transceiver station. Here, the mobile stations are shown to include transceiver circuitry 46 and a signal-to-noise ratio calculator 48 coupled thereto. When the received portion of the transceiver circuitry 46 is tuned to the pilot channel, indications of the signal strengths thereof are provided to the signal-to-noise ratio calculators 48. Values of the signal-to-noise ratios calculated at the calculators 48 are provided to the transmit portion of the transceiver circuitry and returned to the base transceiver station upon the reverse link portion 34.

The base transceiver station 14 also includes transceiver circuitry, here formed of a receive circuitry potion 52 and a transmit circuitry portion 54. The base transceiver station is here shown also to include control circuitry 56. Apparatus of an embodiment of the present invention is formed of functional elements of the control circuitry. While pursuant to the exemplary implementation of an embodiment of the present invention, the functions performed by the various elements of the controlled circuitry 56 include algorithms executable by processing circuitry of which the control circuitry is formed, in other implementations, the functions of the various elements of the control circuitry can be implemented in other manners. The control circuitry 56 shall, also, at times, be referred to as the apparatus 56 of an embodiment of the present invention.

The control circuitry includes a mapper 58. The mapper is coupled to the receive circuitry portion 52 and is operable to map values of the signal-to-noise ratio of the pilot signal generated on the pilot channel into a corresponding indication of the forward link portion 38 of the traffic channel. Indications into which such values are mapped by the mapper are provided to a comparator 62 and to a scheduler 64.

The base transceiver station also includes a storage device 66 having storage locations at which threshold values 68 arranged to form a matrix 72 are located. The matrix formed of the plurality of threshold values are each defined by a pair of communication indicia, herein indicated by the column 74 and the row 76. The exemplary threshold value 68 forming the matrix are values of exemplary threshold values of signal-to-noise ratios.

The comparator 62 is operable to compare values of the signal-to-noise ratio formed by the mapper 58 with the exemplary threshold values 68 of the matrix 72. In one implementation, up to all of the exemplary threshold values 68 are compared with the measured value. Results of the comparisons performed by the comparator are provided to a selector 82. The selector is operable to select a selected one of the exemplary threshold values responsive to the results of the comparisons. The pair of communication indicia associated with the selected exemplary threshold value are retrieved by the selector and provided to a modulator/coder/Walsh-code spreader 84 which forms a portion of the transmit circuitry portion 54 of the base transceiver station. The modulator/coder 84 is coupled to up-conversion circuitry 86 and is also coupled to a data buffer 88. The modulator/coder is operable to modulate and code data provided thereto according to the communication indicia associated with the selected exemplary threshold value. In the exemplary implementation, the communication indicia includes a number N of Walsh codes and a MCS (modulation coding scheme)-type, the level and number of which is determined responsive to the measured communication quality of the radio link.

An embodiment of the present invention is further operable to schedule communication of data packets upon the traffic channel 38 of the forward link portion 32 when the traffic channel forms a shared, packet channel. Packets of data to be communicated to the mobile stations pursuant to separate communication sessions are provided to the base transceiver station and buffered at buffer locations of the buffer 88.

A timer 92 is coupled to the buffer 88 and is operable to time the links of pendency of the packets of data at the buffer. Indications of the time periods timed by the timer 92 are provided to the scheduler 64. In one implementation, additionally, quality of service indications are provided to the scheduler, here represented on the line 94. Responsive to the indications provided thereto, the scheduler schedules when the packets of data buffered at the buffer 88 are provided to the other portions of the transmit circuitry portion 54 and thereafter communicated upon the forward link 32 to a mobile station.

FIG. 2 again illustrates the matrix 72 stored at the storage device 66 shown in FIG. 1. The exemplary threshold values 68 are here arranged in matrix-form in rows and columns to define a two-dimensional matrix. The column 74 is here formed of N number of coding channels here 1 through K code channels. And, the row 76 is formed of different MCS-types, here types 1 through L. Responsive to comparisons performed by the comparator 62 (shown in FIG. 1), the selector 82 (also shown in FIG. 1) selects one of the exemplary threshold value 68 and the communication indicia associated therewith of the column 74 and row 76 are utilized by the transmit circuitry portion 54 to modulate and code the data to be communicated to a mobile station.

Figure 3:
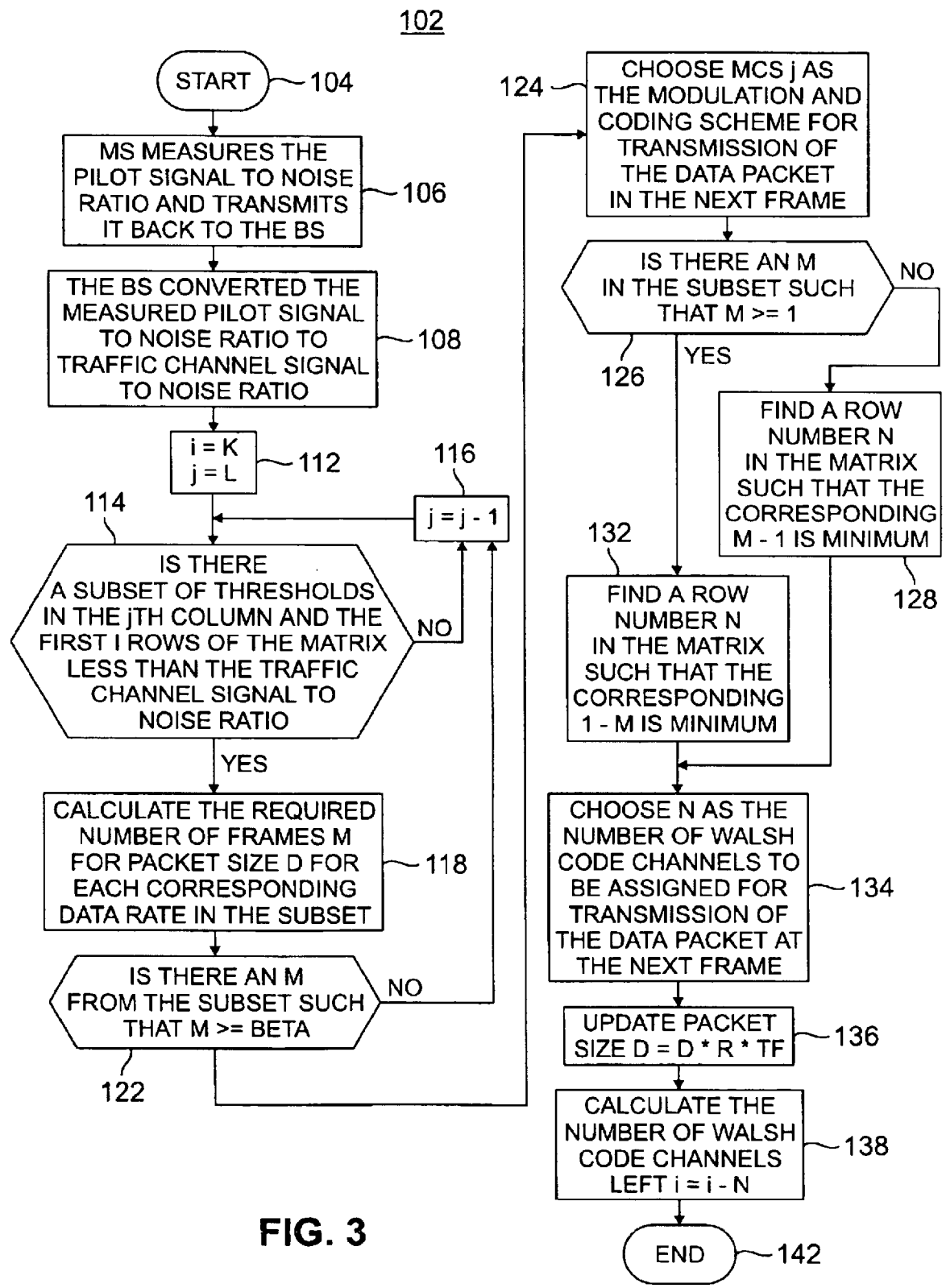
FIG. 3 illustrates a flow diagram of operation of an embodiment of the present invention.

FIG. 3 illustrates a flow diagram, shown generally at 102, which illustrates operation of an embodiment of the present invention by which to select the communication indicia utilized by the modulator/coder 84 (shown in FIG. 1).

Subsequent to start of the method, indicated by the start block 104, measurements are made by a mobile station 12 of the signal-to-noise ratio of the pilot signal transmitted thereto by the base transceiver station and the measured ratio is communicated back to the base transceiver station, all as indicated by the block 106. Then, and as indicated by the block 108, the signal-to-noise ratio returned to the base transceiver station is mapped to a corresponding traffic channel signal-to-noise ratio.

Block 112 indicates initial setting of the subscript values which define the elements of the matrix 68. And, as indicated by the decision block 114, a determination is made as to whether a subset of thresholds in the J column and the first I rows of the matrix is less than the traffic channel signal-to-noise ratio. If not, the node branch is taken to the block 116, and the value of j is decremented. If, conversely, the determination made at the decision block 114 is affirmative, the yes branch is taken to the block 118. At the block 118, the required number of frames M for a packet size D for each corresponding data rate in the subset is calculated.

Then, and as indicated by the decision block 122, a determination is made as to whether there is a value M from the subset such that M is greater than or equal to a value, e.g., beta. If not, the node branch is taken back to the block 116 and the value of j is again decremented. Otherwise, the s branch is taken to the block 124.

At the block 124, the modulation coding scheme (MCS) of value j is chosen as the modulation and coding scheme for transmission of the data packet in a subsequent frame of data. Then, and as indicated at the decision block 126, a determination is made as to whether there is a value of M in the subset such that M is less than or equal to 1. If not, the node branch is taken to the block 128, and, if so, the s branch is taken to the block 132. At the block 128, a row number N in the matrix is found such that the corresponding value of M minus 1 is a minimum. And, at the block 132 a row number N is found in the matrix such that the corresponding 1 minus M value is a minimum.

Subsequent to the operations performed at the blocks 128 and 132, and as indicated by the block 134, a value of N is chosen as the number of Walsh code channels to be assigned for transmission of the data packet at the next frame. Then, and as indicated by the block 136, the packet size is updated. Then, and as indicated by the block 138, the number of Walsh code channels remaining is calculated such that i equals i minus N, the method ends, indicated by the end block 142.

Figure 4:
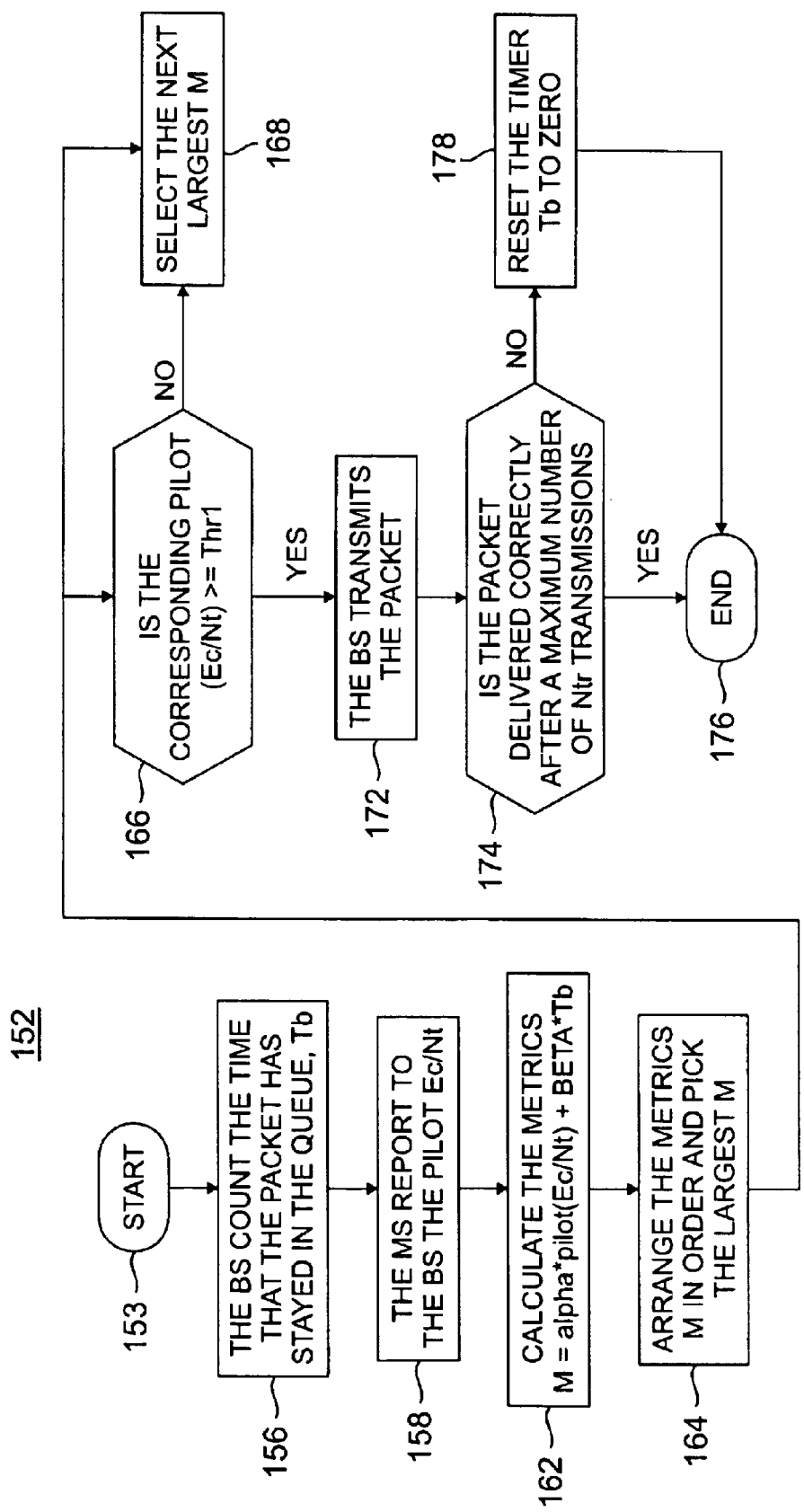
FIG. 4 illustrates a flow diagram of another embodiment of the present invention.

FIG. 4 illustrates a flow diagram, shown generally at 152, representative of operation of another embodiment of the present invention by which to schedule allocation of a shared channel upon which to communicate data packets to mobile stations pursuant to two or more communication sessions.

After start, indicated by the start block 153, a counter of a base transceiver station counts the amount of time that a data packet has remained in a buffer. The time period is indicated by Tb and the counting operation is indicated by the block 156. Then, and as indicated by the block 158, the signal-to-noise ratio, herein indicated Ec/Nt of the pilot signal detected by a mobile station is reported back to the base transceiver station.

The measured value of the signal-to-noise ratio is used in the calculation of a metric M wherein M equals alpha*pilot (Ec/Nt) plus beta*Tb, indicated by the block 162. Then, and as indicated by the block 164, the calculated metric values M are arranged in sequential order and the largest value of M is selected.

Thereafter, and as indicated by the decision block 166, a determination is made as to whether the corresponding pilot signal-to-noise ratio is greater than a selected threshold, here THR1. If not, the node branch is taken to the block 168. At the blocks 168, the next-largest value of M is selected and a loop is taken back to the decision block 166. If, conversely, a positive determination is made at the decision block 166, the s branch is taken to the block 172 and the base transceiver station transmits the data packet. Thereafter, and as indicated by the decision block 174, a determination is made as to whether the packet is delivered correctly after a maximum number of NTR transmissions. If so, the s branch is taken to the end block 176. Otherwise, the node branch is taken to the block 178 and the timer Tb is reset to zero and thereafter a branch is taken to the end block 176.

Thereby, through operation of various embodiments of the present invention, a manner is provided by which to select communication indicia, such as the number N of Walsh codes and a MCS-type by which to code and modulate to data prior to its transmission upon a communication channel. Also, through operation of an embodiment of the present invention, a manner is provided by which to schedule data packets for communication upon a shared packet channel to mobile stations pursuant to separate communication sessions.

The previous descriptions are of preferred examples for implementing the invention, and the scope of the invention should not necessarily be limited by this description. The scope of the present invention is defined by the following claims. The claims are on separate sheets and are as indicated on the Xerox copies. A final page of the application is entitled "The Abstract," and the abstract is as follows: "Apparatus, and an associated method, for allocating resources in a communication system, such as a multi-code, multi-rate CDMA communication system. Communication indicia by which data to be communicated during operation of the communication system is coded and modulated is selected responsive to communication characteristics of the communication channel upon which the data is to be communicated. The levels of coding and modulation are determined responsive to measured levels of the communication characteristics on the channel. Also, a scheduler by which to schedule packet communication upon a shared communication channel is provided."

While the invention has been particularly shown and described with reference to a preferred embodiment thereof, it will be understood by those skills in the art that various other changes in the form and details may be made without departing from the spirit and scope of the invention.

What is claimed is:

1. Apparatus for a communication system in which data is communicated with a communication station upon a traffic channel, said apparatus for facilitating selection of resource allocation in the communication system, the resource allocation defined in terms of a first communication indicia and a second communication indicia, said apparatus comprising:

a storage device having memory locations for storing a matrix defined in a first dimension by values of the first communication indicia and in a second dimension by the second communication indicia, each element of the matrix of an exemplary threshold value;

a comparator coupled to said storage device, said comparator for comparing a traffic-channel threshold value representative of communication upon the traffic channel with at least some of the exemplary threshold values of the matrix stored at the memory location of said storage device and for iteratively comparing the exemplary threshold values contained in the matrix to the traffic channel threshold to locate a selected exemplary threshold value of a selected magnitude relative to the traffic channel threshold; and a selector coupled to said comparator, said selector for selecting the resource allocation responsive to comparisons made by said comparator and location of the selected exemplary threshold value, the resource allocation defined in terms of both the first communication indicia and the second communication indicia that define location of the selected exemplary threshold value in the matrix, with the selected exemplary threshold value.

2. The apparatus of claim 1 wherein the communication system comprises a multi-code, multi-rate communication system, wherein the first communication indicia comprises a coding indicia, and wherein the matrix stored at said storage device is defined, in part, by values of the coding indicia.

3. The apparatus of claim 2 wherein the communication system comprises a CDMA (code-division, multiple-access) communication system that utilizes Walsh coding with N codes and wherein the coding indicia that defines, in part, the matrix stored at said storage device defined, in part, by values of N.

4. The apparatus of claim 1 wherein the communication system comprises a multi-rate, multi-code communication system, wherein the second communication indicia comprises a modulation coding scheme (MCS) value, and wherein the matrix stored at said storage device is defined, in part, by values of the modulation coding scheme.

5. The apparatus of claim 4 wherein each value of the modulation coding scheme is representative of a level of modulation coding by which data to be communicated upon the traffic channel is to be encoded.

6. The apparatus of claim 1 wherein the communication system comprises a radio communication system having network infrastructure, wherein the communication station forms a portion of the network infrastructure and the communication system further comprising a mobile station, and wherein said storage device at which the matrix is stored is located at the network infrastructure.

7. The apparatus of claim 6 wherein the network infrastructure comprises a base transceiver station (BTS) and wherein said storage device is located at the base transceiver station.

8. The apparatus of claim 1 wherein the traffic channel threshold value which said comparator compares with at least some of the exemplary threshold values comprises a value representative of communication quality levels of the traffic channel.

9. The apparatus of claim 8 wherein communications with the communication station are effectuated upon a forward link, and wherein the traffic channel threshold value is representative of communication quality levels upon the forward link.

10. The apparatus of claim 9 wherein the traffic channel threshold value is of a level responsive to measured values of forward link communication conditions.

11. The apparatus of claim 10 wherein the traffic channel threshold value is representative of a signal-to-noise ratio on the forward link.

12. The apparatus of claim 1 further comprising a coder and modulator coupled to said selector, said coder and modulator for coding and modulating the data to be communicated upon the traffic channel responsive to values of the first and second communication indicia, respectively, associated with the selected exemplary threshold value.

13. The apparatus of claim 12 wherein said coder and modulator is further for performing Walsh-code spreading, the Walsh-code spreading defined in terms of a number N of Walsh codes by which to spread the data.

14. The apparatus of claim 1 wherein the communication system comprises a multi-user communication system, wherein the traffic channel comprises a shared channel; said apparatus further comprising a scheduler for scheduling access to the shared channel upon which to communicate the data.

15. The apparatus of claim 14 wherein said scheduler schedules the access to the shared channel responsive, in part, to the traffic channel threshold value.

16. The apparatus of claim 15 wherein the data communicated during operation of the communication system comprises packet data, said apparatus further comprising a timer for timing periods of pendency of packet data prior to access to the shared channel to communicate the packet data thereon.

17. The apparatus of claim 16 wherein said scheduler schedules the access to the shared channel further responsive, in part, to the periods of pendency timed by said timer.

18. The apparatus of claim 17 further comprising a buffer for storing the packets of data, said timer for timing pendency of the packet data at said buffer.

19. The apparatus of claim 17 wherein communications in the communication system are effectuated at a selected QoS (quality of service) level and wherein scheduling made by said scheduler is further responsive, in part, to the selected QoS level.

20. A method for communicating data with a communication station upon a traffic channel defined in a communication system, said method for facilitating selection of resource allocation in the communication system, the resource allocation defined in terms of a first communication indicia and a second communication indicia, said method comprising the operations of:

forming a matrix of exemplary threshold values, the exemplary threshold values each indexed by values of the first communication indicia in a first dimension and the second communication indicia in a second dimension;

comparing a traffic channel threshold value representative of communication upon the traffic channel with at least some of the exemplary threshold values of the matrix formed during said operation of forming and iteratively comparing the exemplary threshold values contained in the matrix to the traffic channel threshold to locate a selected exemplary threshold value of a selected magnitude relative to the traffic channel threshold;

selecting, responsive to comparisons formed during said operation of comparing and location of the selected exemplary threshold value, the resource allocation, the resource allocation defined in terms of both the first communication indicia and the second communication indicia that define location of the selected exemplary threshold value in the matrix, with the selected exemplary threshold value; and operating upon the data using the first communication indicia and the second communication indicia in terms of which the resource allocation selected during said operation of selecting is defined.

21. The method of claim 20 wherein the communication system comprises a multi-user communication system, wherein the traffic channel comprises a shared channel; said method further comprising the operation of scheduling access to the shared channel upon which to communicate the data.

* * * * *